(12) United States Patent
Wyland

(10) Patent No.: US 6,874,049 B1
(45) Date of Patent: Mar. 29, 2005

(54) SEMAPHORES WITH INTERRUPT MECHANISM

(75) Inventor: David C. Wyland, Morgan Hill, CA (US)

(73) Assignee: Cradle Technologies, Inc., Sunnyvale, CA (US)

( * ) Notice: Subject to any disclaimer, the term of this patent is extended or adjusted under 35 U.S.C. 154(b) by 388 days.

(21) Appl. No.: 10/061,544

(22) Filed: Feb. 1, 2002

Related U.S. Application Data

(60) Provisional application No. 60/266,002, filed on Feb. 2, 2001.

(51) Int. Cl.[7] .................................................. G06F 9/48
(52) U.S. Cl. ...................................... 710/260; 712/244
(58) Field of Search ................................ 710/240, 260; 712/244

(56) References Cited

U.S. PATENT DOCUMENTS

| | | | |
|---|---|---|---|
| 5,534,795 A | 7/1996 | Wert et al. | 326/81 |
| 5,940,856 A | 8/1999 | Arimilli et al. | 711/119 |
| 6,018,785 A | * | 1/2000 | Wenniger | 710/200 |
| 6,108,756 A | * | 8/2000 | Miller et al. | 711/148 |
| 2002/0073259 A1 | * | 6/2002 | Grisenthwaite | 710/107 |
| 2003/0018841 A1 | * | 1/2003 | Lesartre | 710/200 |

* cited by examiner

*Primary Examiner*—Glenn A. Auve
(74) *Attorney, Agent, or Firm*—Schneck & Schneck; Thomas Schneck; Mark Protsik

(57) ABSTRACT

Disclosed is a multiprocessor system including a semaphore register and a semaphore interrupt register. In addition, for each processor in the multiprocessor system, there is a semaphore interrupt enable register. If a first processor finds that a semaphore cell of the semaphore register holds a "1" indicating that an associated shared resource is being accessed by a second processor, the first processor sets a corresponding semaphore interrupt enable cell of the semaphore interrupt enable register to "1" so as to enable semaphore interrupt. When the second processor finishes with the shared resource, the second processor writes a 0 into the semaphore cell, causing a corresponding semaphore interrupt cell of the semaphore interrupt register to hold a "1". This, combined with the fact that the semaphore interrupt enable cell also holds a "1", causes an interrupt to the first processor. In response, the first processor services the interrupt and accesses the shared resource. As a result, repetitive reading and writing the semaphore cell by the first processor via a system bus of the multiprocessor system can be avoided.

6 Claims, 3 Drawing Sheets

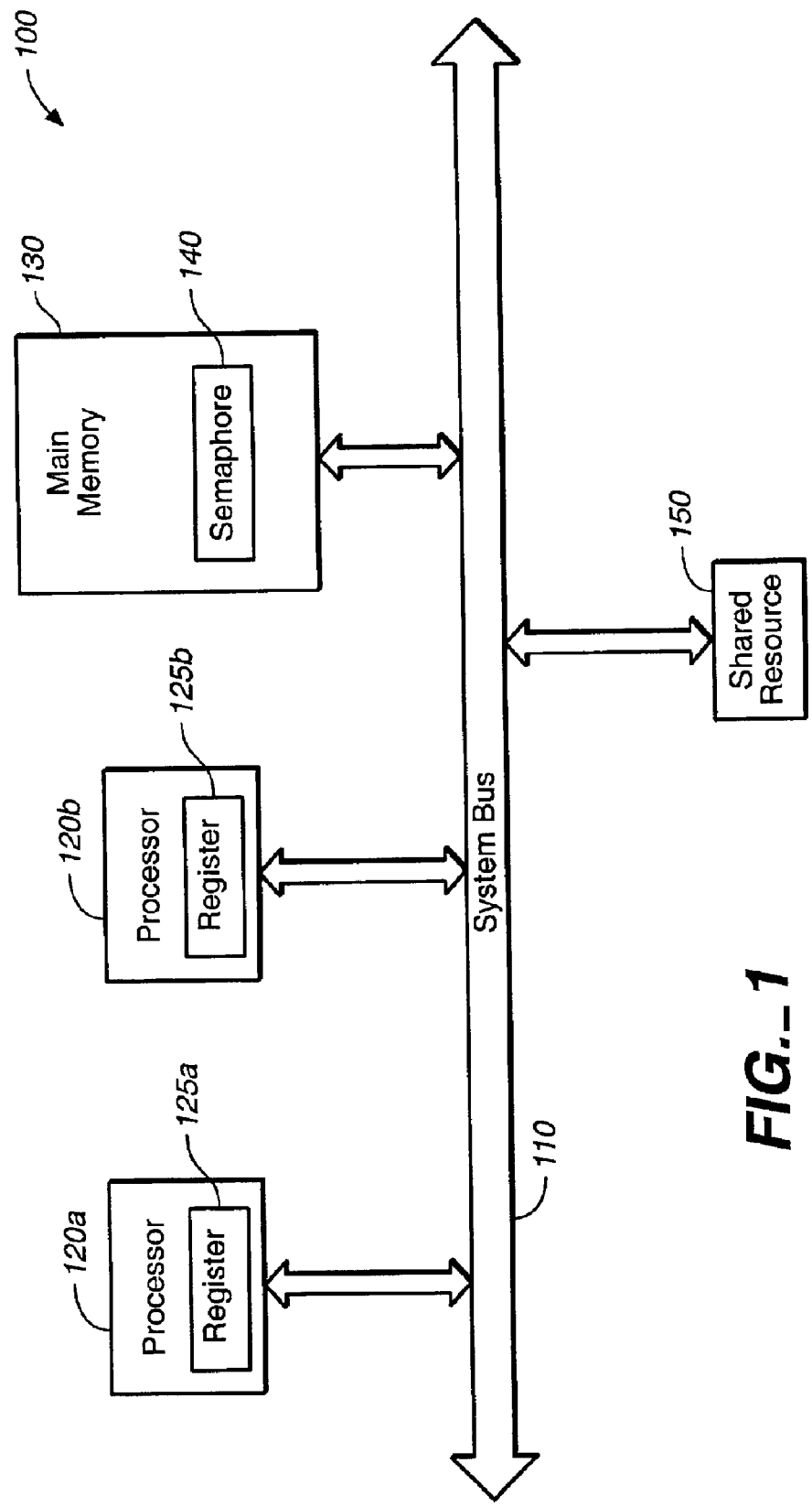
FIG._1

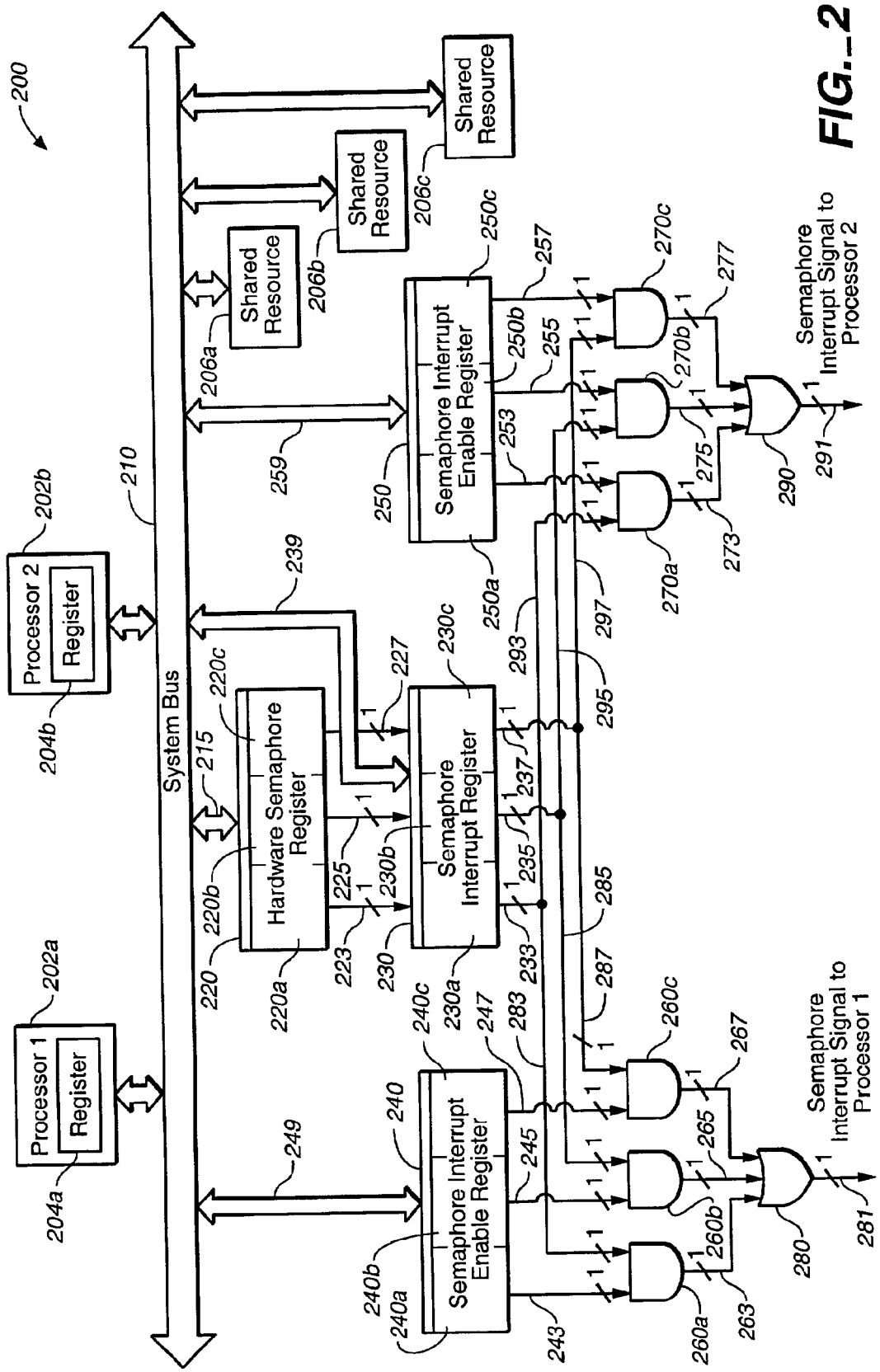
FIG._2

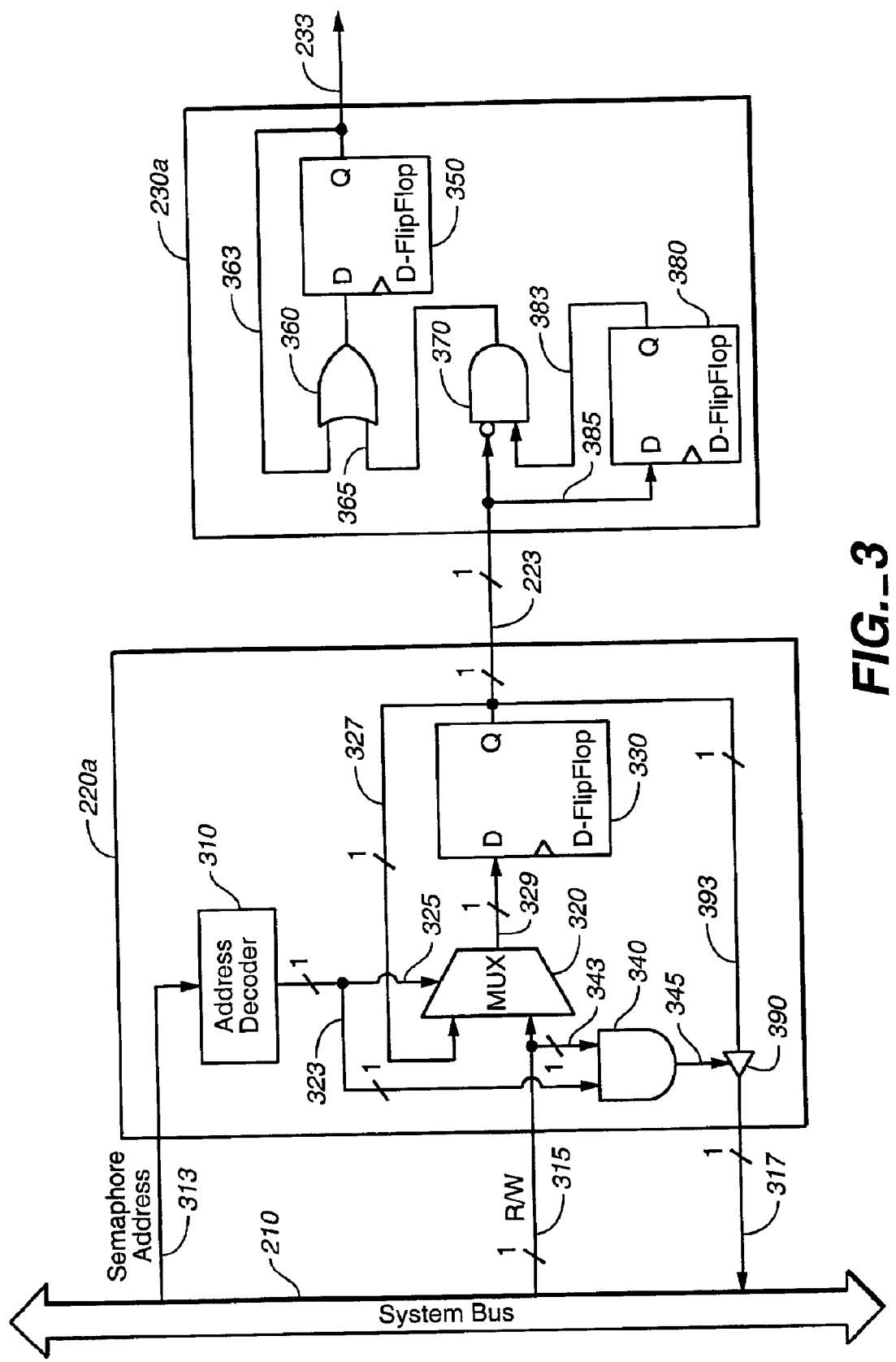
FIG._3

SEMAPHORES WITH INTERRUPT MECHANISM

CROSS-REFERENCE TO RELATED APPLICATION

This application claims the benefit of U.S. provisional application No. 60/266,002, filed Feb. 2, 2001.

TECHNICAL FIELD

The invention generally relates to semaphores, and more particularly to semaphores in a multiprocessor system.

BACKGROUND ART

FIG. 1 shows a multiprocessor system 100 of the prior art. The multiprocessor system 100 includes a system bus 110, a plurality of processors 120a, 120b coupled to the system bus 110, a main memory 130 coupled to the system bus 110, and a shared resource 150 coupled to the system bus 110. The main memory 130 includes a semaphore 140 which is used to monitor access to the shared resource 150 by the processors 120a, 120b. The processors 120a, 120b each include a register 125a, 125b.

In the prior art, the semaphore 140 is implemented by using a location in the main memory 130 whose content the processors 120a, 120b examine to determine whether the shared resource 150 is available for access. Assuming that initially the shared resource 150 is available for access, that is, both the processors 120a, 120b are not using the shared resource 150, then the content of the semaphore 140 would be a "0", indicating that the shared resource 150 is available for access. Assuming further that the processor 120a needs to access the shared resource 150, then the processor 120a would read the content of the semaphore 140 into its register 125a and then write a "1" into the semaphore 140. Design of the multiprocessor system 100 guarantees that the reading of the semaphore 140 and writing a "1" into the semaphore 140 by the processor 120a, or by any other processor, constitutes one bus transaction. That is, the processor 120a seizes the system bus 110 continuously for both the reading and writing of the semaphore 140. Without this guarantee by design, a race condition may occur. A race condition occurs when at least two processors have access to a shared resource at the same time.

The processor 120a examines the copy of the content of the semaphore 140 which it receives in its register 125a and finds that the copy is a "0", indicating that the shared resource 150 is currently available for access. The processor 120a accesses the shared resource 150. Assume that while the processor 120a is using the shared resource 150, the processor 120b needs to access the shared resource 150. The processor 120b reads the content of the semaphore 140 into its register 125b and writes a "1" into the semaphore 140. Again, the design of the multiprocessor system 100 guarantees that the reading of the semaphore 140 and writing a "1" into the semaphore 140 by the processor 120b would constitute one bus transaction. The processor 120b then examines the copy of the content of the semaphore 140 which it receives in its register 125b and finds that the copy is a "1" indicating that the shared resource 150 is currently not available for access. The processor 120b would then execute a program loop that includes: (a) reading the content of the semaphore 140 into its register 125a, (b) writing a "1" into the semaphore 140, and (c) examining the copy of the content of the semaphore 140 which it receives in its register 125b. The processor 120b executes the program loop until the copy of the content of the semaphore 140 which the processor 120b receives in its register 125b is a "0".

When the processor 120a finishes using the shared resource 150, the processor 120a writes a "0" into the semaphore 140. Recognizing that the content of the semaphore 140 becomes a "0", the processor 120b exits the program loop and accesses the shared resource 150. As a result, no race condition can occur.

While waiting for the shared resource 150 to be released by the processor 120a, the processor 120b keeps reading and writing the semaphore 140. This requires repeated use of the system bus 110. When the number of processors in the multiprocessor system 100 increases, a higher percentage of system bus cycles will be wasted on the processors reading and writing the semaphore 140 to determine when the shared resource 150 is released.

It is the object of the present invention to provide a method and apparatus in which semaphore implementation does not require repeated reading and writing the semaphore and, therefore, effectively increases the system bus throughput.

SUMMARY OF THE INVENTION

The above objects have been achieved by a digital system comprising a semaphore cell, an interrupt generation circuit coupled to the semaphore cell, and a processor coupled to the interrupt generation circuit. The semaphore cell is configured to have a first state and a second state, the first state of the semaphore cell indicating that a shared resource is available for access, and the second state of the semaphore cell indicating that the shared resource is unavailable for access. The interrupt generation circuit is configured to generate a semaphore interrupt signal to the processor if the semaphore cell changes from the second state to the first state and if the processor need to access the shared resource.

In another embodiment of the present invention, a method of using semaphores to monitor shared resource accesses is described. The method comprises providing a the semaphore cell configured to have a first state and a second state, the first state of the semaphore cell indicating that the shared resource is available for access, and the second state of the semaphore cell indicating that the shared resource is unavailable for access. The method further comprises providing an interrupt generation circuit coupled to the semaphore cell and a processor coupled to the interrupt generation circuit. The method further comprises generating, with the interrupt generation circuit, a semaphore interrupt signal to the processor if the semaphore cell changes from the second state to the first state and if the processor need to access the shared resource.

BRIEF DESCRIPTION OF THE DRAWINGS

FIG. 1 shows a block diagram of a multiprocessor system 100 of prior art.

FIG. 2 shows a circuit diagram of a digital system 200 for implementing semaphores according to one embodiment of the present invention.

FIG. 3 shows a circuit diagram of one embodiment of the hardware semaphore cell 220a of the hardware semaphore register 220 and the corresponding semaphore interrupt cell 230a of the semaphore interrupt register 230 of FIG. 2.

DETAILED DESCRIPTION OF THE PREFERRED EMBODIMENTS

With reference to FIG. 2, the digital system 200 includes, illustratively, a system bus 210, processors 202a and 202b, shared resources 206a, 206b, and 206c, a hardware semaphore register 220, a semaphore interrupt register 230, semaphore interrupt enable registers 240 and 250, six AND gates 260a, 260b, 260c, 270a, 270b, and 270c, and two OR gates 280 and 290. The processors 202a and 202b include registers 204a and 204b, respectively.

The hardware semaphore register 220 includes, illustratively, three hardware semaphore cells 220a, 220b, and 220c. The hardware semaphore cells 220a, 220b, and 220c are used to monitor access to the shared resources 206a, 206b, and 206c, respectively. In general, if a processor 202i (i=a or b) reads a hardware semaphore cell 220j (j=a, b, or c), the processor 202i receives the current content of the hardware semaphore cell 220j and the content of the hardware semaphore cell 220J becomes a "1". If a processor 202i writes a hardware semaphore cell 220j, the content of the hardware semaphore cell 220j always becomes a "0". In other words, if a processor 202i reads a hardware semaphore cell 220j which currently holds a "0", the processor 202i receives a "0" and the content of the hardware semaphore cell 220j becomes "1". If a processor 202i reads a hardware semaphore cell 220J which currently holds a "1", the processor 202i receives a "1" and the content of the hardware semaphore cell 220J remains "1".

The semaphore interrupt register 230 includes, illustratively, three semaphore interrupt cells 230a, 230b, and 230c, coupled to the hardware semaphore cells 220a, 220b, and 220c via connection line 223, 225, and 227, respectively. The semaphore interrupt enable register 240 includes, illustratively, three semaphore interrupt enable cells 240a, 240b, and 240c. The semaphore interrupt enable cells 240a, 240b, and 240c provides inputs to the AND gates 260a, 260b, and 260c via connection lines 243, 245, and 247, respectively. The AND gates 260a, 260b, and 260c also receive inputs from the semaphore interrupt cells 230a, 230b, and 230c via connection lines 233–283, 235–285, and 237–287. The AND gates 260a, 260b, and 260c generates three outputs to the OR gate 280 via connection lines 263, 265, and 267, respectively. The OR gate 280 generates a first semaphore interrupt signal to the processor 202a via connection line 281 if at least one of the AND gates 260a, 260b, and 260c generates a "1" to the OR gate 280.

Similarly, the semaphore interrupt enable register 250 includes, illustratively, three semaphore interrupt enable cells 250a, 250b, and 250c. The semaphore interrupt enable cells 250a, 250b, and 250c provides inputs to the AND gates 270a, 270b, and 270c via connection lines 253, 255, and 257, respectively. The AND gates 270a, 270b, and 270c also receive inputs from the semaphore interrupt cells 230a, 230b, and 230c via connection lines 233–293, 235–295, and 237–297. The AND gates 270a, 270b, and 270c generates three outputs to the OR gate 290 via connection lines 273, 275, and 277, respectively. The OR gate 290 generates a second semaphore interrupt signal to the processor 202b via connection line 291 if at least one of the AND gates 270a, 270b, and 270c generates a "1" to the OR gate 290.

For illustration of the operation of the digital system 200, assume that, initially, the hardware semaphore cell 220a, the semaphore interrupt cell 230a, and the semaphore interrupt enable cells 240a and 250a all hold a "0". Assume further that the processor 202a needs to access the shared resource 206a. The processor 202a reads the hardware semaphore cell 220a into its register 204a. Reading the hardware semaphore cell 220a by the processor 202a automatically changes the content of the hardware semaphore cell 220a from "0" to "1". The processor 202a then examines the copy of the hardware semaphore cell 220a which it gets in its register 204a and finds that the copy is a "0" indicating that the shared resource 206a is currently available for access. The processor 202a then accesses the shared resource 206a.

Assume that while the processor 202a is using the shared resource 206a, the processor 202b needs to access the shared resource 206a. The processor 202b reads the hardware semaphore cell 220a into its register 204b. Any reading of the hardware semaphore cell 220a by any processor automatically sets the content of the hardware semaphore cell 220a to "1". Because the hardware semaphore cell 220a currently holds a "1", reading the hardware semaphore cell 220a by the processor 202b does not change this content of hardware semaphore cell 220a (still a "1"). The processor 202b then examines the copy of the hardware semaphore cell 220a which it gets in its register 204b and finds that the copy is a "1" indicating that the shared resource 206a is currently unavailable for access. The processor 202b sets the content of the semaphore interrupt enable cell 250a to "1" and then switches to another task. As a result, the AND gate 270a receives as an input a "1" from the semaphore interrupt enable cell 250a via connection line 253.

When the processor 202a no longer needs access to the shared resource 206a, the processor 202a writes a "0" into the hardware semaphore cell 220a. This causes the content of the semaphore interrupt cell 230a to change from "0" to "1". This content of "1" of the semaphore interrupt cell 230a propagates to the AND gate 270a as an input via connection line 233–293. In response, the AND gate 270a generates a "1" to the OR gate 290 which in turn generates a "1" as the second semaphore interrupt signal to the processor 202b causing an interrupt in the processor 202b.

This content of "1" of the semaphore interrupt cell 230a also propagates to the AND gate 260a as an input via connection line 233–283. However, because the semaphore interrupt enable cell 240a holds a "0", the other input of the AND gate 260a is a "0". As a result, the AND gate 260a generates a "0" to the OR gate 280 which in turn generates a "0". Therefore, no interrupt occurs in the processor 202a.

In response to the interrupt, the processor 202b services the interrupt by reading the contents of the semaphore interrupt register 230 and semaphore interrupt enable registers 250 via connection buses 239 and 259, respectively. Because both the semaphore interrupt cell 230a and the semaphore interrupt enable cell 250a hold a "1", processor 202b can determine that the release of the corresponding shared resource 260a caused the interrupt. The processor 202b then writes a "0" to both the semaphore interrupt cell 230a and semaphore interrupt enable cell 250a via connection buses 239 and 259, respectively. The processor 202b then reads the hardware semaphore cell 220a into its register 204b. The reading of the hardware semaphore cell 220a by the processor 202b also changes to content of the hardware semaphore cell 220a from "0" to "1". The processor 202b then examines the copy of the hardware semaphore cell 220a which it gets in its register 204b and finds that the copy is a "0" indicating that the shared resource 206a is currently available for access. The processor 202b then accesses the shared resource 206a. In summary, the processor 202b does not have to repeatedly check the hardware semaphore cell 220a via the system bus 210 to determine if the shared resource 206a is released. As a result, the throughput of the system bus 210 is increased.

In a similar manner, the hardware semaphore cell 220b, the semaphore interrupt cell 230b, and the semaphore interrupt enable cells 240b and 250b are used to monitor access to the shared resource 206b by the processors 202a and 202b, respectively. Also in a similar manner, the hardware semaphore cell 220c, the semaphore interrupt cell 230c, and the semaphore interrupt enable cells 240c and 250c are used to monitor access to the shared resource 206c by the processors 202a and 202b, respectively.

With reference to FIG. 3, the hardware semaphore cell 220a and the semaphore interrupt cell 230a of FIG. 2 are shown in further detail according to one preferred embodiment. The hardware semaphore cell 220a includes an address decoder 310, a multiplexer 320, a D flip-flop 330, an AND gate 340, and a tri-state buffer 390. The Q output of the D flip-flop 330 holds the current content of the hardware semaphore cell 220a.

Assume the processor 202a (FIG. 2) reads the hardware semaphore cell 220a. The processor 202a reads the hardware semaphore cell 220a by putting a unique address of the hardware semaphore cell 220a on a semaphore address bus 313 and putting a "1" on a control line 315. In response, the address decoder 310 generates a "1" to the multiplexer 320 via a connection line 325 causing the multiplexer 320 to electrically connect the control line 315 to the D input of the D flip-flop 330 via connection line 329. AB a result, the output Q of the D flip-flop 330 will hold a "1" in the next clock cycle. The AND gate 340 receives a "1" from the address decoder 310 via connection line 323. The AND gate 340 also receives a "1" from the control line 315. As a result, the AND gate 340 generates a "1" to the buffer 390 causing the buffer 390 to pass the current content of the D flip-flop 330 at the output Q of the D flip-flop 330 to the processor 202a via connection lines 393, 317, and the system bus 210. In summary, the reading of the hardware semaphore cell 220a by the processor 202a gives the processor 202a the current content of the hardware semaphore cell 220a and puts a "1" into the hardware semaphore cell 220a.

The semaphore interrupt cell 230a includes, illustratively, D flip-flops 350 and 380, an OR gate 360, and an AND gate 370. The Q output of the D flip-flop 350 holds the current content of the semaphore interrupt cell 230a. Assume that the hardware semaphore cell 220a currently holds a "1" indicating the processor 202a is using the shared resource 206a (FIG. 2) and that the semaphore interrupt cell 230a currently holds a "0". In other words, the Q output of the D flip-flop 330 currently holds a "1" and the Q output of the D flip-flop 350 currently holds a "0". The D input and the Q output of the D flip-flop 380 also hold a "1".

When the processor 202a finishes using the shared resource 206a, the processor 202a writes a "0" into the hardware semaphore cell 220a. The processor 202a writes a "0" into the hardware semaphore cell 220a by putting the unique address of the hardware semaphore cell 220a on the semaphore address bus 313 and putting a "0" on the control line 315. The address decoder 310 generates a "1" to the multiplexer 320 causing the multiplexer 320 to pass the value "0" on the control line 315 to the D input of the D flip-flop 330. As a result, the hardware semaphore cell 220a will hold a "0" in the next clock cycle.

When the Q output of the D flip-flop 330 changes from "1" to "0", the output of the AND gate 370 changes from "0" to "1". As a result, the output of the OR gate 360 changes from "0" to "1", which is applied to the D input of the D flip-flop 350. In the next clock cycle, the semaphore interrupt cell 230a will hold a "1", which is applied to the AND gate 270a (FIG. 2) via connection line 233–293. In response, the AND gate 270a generates a "1" to the OR gate 290, assuming that the semaphore interrupt enable cell 250a has been set to "1" by the processor 202b. As a result, the OR gate 290 generates a "1" as the second semaphore interrupt signal to the processor 202b causing an interrupt in the processor 202b. In response to the interrupt, the processor 202b services the interrupt by determining which semaphore caused the interrupt. The processor 202b makes this determination by comparing the contents of the semaphore interrupt register 230 and semaphore interrupt enable register 250. Because both the semaphore interrupt cell 230a and the semaphore interrupt enable cell 250a hold a "1", the processor 202b can determine that the semaphore interrupt cell 230a caused the interrupt. In other words, the processor 202b can determine that the release of the shared resource 206a caused the interrupt. The processor 202b then writes a "0" to both the semaphore interrupt cell 230a and semaphore interrupt enable cell 250a via connection buses 239 and 259, respectively. The processor 202b then reads the hardware semaphore cell 220a into its register 204b. The reading of the hardware semaphore cell 220a by the processor 202b also changes to content of the hardware semaphore cell 220a from "0" to "1". The processor 202b then examines the copy of the hardware semaphore cell 220a which it gets in its register 204b and finds that the copy is a "0" indicating that the shared resource 206a is currently available for access. The processor 202b then accesses the shared resource 206a.

In summary, in the present invention, the use of hardware semaphores coupled with interrupt mechanism avoids race conditions and repetitive use of the system bus for checking the contents of the hardware semaphores.

In one embodiment of the present invention, "software semaphores" may be used in place of hardware semaphores 220. The software semaphores may be registers like the hardware semaphores 220 but do not automatically change to a certain state (e.g., become "1") when being read by a processor. If software semaphores are used, the instruction set must include a special test-and-set instruction which reads the software semaphores and sets the software semaphores to "1" in one atomic action.

In another embodiment of the present invention, the digital system 200 may have M processors 202 and N shared resources 206. Accordingly, the digital system 200 has a hardware semaphore register 220 and a semaphore interrupt register 230 each of which has N cells corresponding to the N shared resources 206. The digital system 200 further has M semaphore interrupt enable registers 240, 250 corresponding to the M processors 202. Each semaphore interrupt enable register 240, 250 has N cells corresponding to the N shared resources 206. In the embodiments of the present invention described above, M=2 and N=3.

What is claimed is:

1. In a digital system of the type having at least first and second processors and at least one shared resource accessible to the processors via a system bus, the bus allowing only one bus transaction in any one clock cycle, a hardware semaphore circuit coupled to said system bus and configured to monitor shared resource accesses by said processors, the hardware semaphore circuit comprising:

a semaphore cell coupled to the first and second processors via the system bus and configured to have a first state and a second state, the first state indicating that the shared resource is available for access and the second state indicating that the shared source is unavailable for access, and configured to be in the second state after being read by any processor and to change back to the first state after the shared resource is again made available for access; and an interrupt generation circuit coupled to the first and second processors via the system bus and coupled to an output of the semaphore cell, and configured to generate a semaphore interrupt signal to any processor requesting access to the shared resource whenever the semaphore cell changes from the second state back to the first state, the interrupt generation circuit comprising:
  (i) a semaphore interrupt cell coupled to the output of the semaphore cell and configured to have a third state and a fourth state, the fourth state indicating that the semaphore cell has changed from the second state back to the first state and thus that the shared resource has just been made available for access;
  (ii) first and second semaphore interrupt enable cells respectively coupled to the first and second processors via the system bus, each semaphore interrupt enable cell configured to have a fifth state and a sixth state, the fifth state indicating that the corresponding processor does not need to access the shared resource and the sixth state indicating that the corresponding processor has read the semaphore cell and found that the semaphore is in the second state; and
  (iii) first and second logic gate circuits coupled to the semaphore interrupt cell, to respective first and second semaphore interrupt enable cells, and via the system bus to respective first and second processors, each logic gate circuit configured to generate a semaphore interrupt signal to its corresponding processor if the semaphore interrupt cell is in the fourth state and the corresponding semaphore interrupt enable cell is in the sixth state, the semaphore interrupt cell and a corresponding semaphore interrupt enable cell further configured to change back to their respective third and fifth states after the semaphore interrupt signal is sent to its corresponding processor.

2. The hardware semaphore circuit in a digital system as in claim 1, wherein the system has multiple shared resources, and the semaphore cell, the semaphore interrupt cell and the first and second semaphore interrupt enable cells are cells of corresponding registers with one cell of each register dedicated to semaphore operations for a particular shared resource.

3. The hardware semaphore circuit in a digital system as in claim 1, wherein more than two processors can access the at least one shared resource via the system bus, and the interrupt generation circuit comprises additional semaphore interrupt enable cells and logic gate circuits corresponding each additional processor.

4. The hardware semaphore circuit in a digital system as in claim 1, wherein the semaphore cell comprises (i) a semaphore address input bus, a read/write control input line, and a semaphore data output line, all coupled to the system bus, (ii) an address decoder coupled to the semaphore address input bus and configured to generate a signal in response to a unique address associated with the semaphore cell for the shared resource, (iii) a multiplexer having a first input, a second input coupled to the read/write control input line, a control input coupled to receive the signal generated by the address decoder, and an output, the multiplexer configured to connect its second input to its output in response to receiving the signal from the address decoder but otherwise to connect its first input to its output, (iv) a flip-flop having a data input coupled to the output of the multiplexer and a data output coupled to the semaphore interrupt cell as an output of the semaphore cell and to the first input of the multiplexer, (v) an AND gate having a first input coupled to receive the signal generated by the address decoder, a second input coupled to the read/write control input line, and an output, and (vi) a buffer having a buffer input coupled to the output of the flip-flop, an enable input coupled to the output of the AND gate, and a buffer output coupled via the semaphore data output line to the system bus.

5. They hardware semaphore circuit in a digital system as in claim 1, wherein the semaphore interrupt cell comprises (i) a first flip-flop having a data input coupled to the output of the semaphore cell, and a data output, (ii) an AND gate having a first input coupled to the output of the semaphore cell and a second input coupled to the output of the first flip-flop, one of the data input of the first flip-flop and the first input of the AND gate being an inverted input, the AND gate also having an output, (iii) an OR gate having a first input, a second input coupled to the output of the AND gate, and an output, and (iv) a second flip-flop having a data input coupled to the output of the OR gate and a data output coupled to the first input of the OR gate, the data output of the second flip-flop forming the output of the semaphore interrupt cell.

6. A method of using a hardware semaphore circuit to monitor shared resource accesses over a system bus that allows only one bus transaction in any one clock cycle, there being at least first and second processors and at least one shared resource coupled to said system bus together with said hardware semaphore circuit, the method comprising:
  reading a state of a semaphore cell of the hardware semaphore circuit by a first processor and if the state read from the semaphore cell is a first state, indicating that the shared resource is available for access, then accessing the shared resource by the first processor, but if the state read from the semaphore cell is a second state, indicating that the shared resource is unavailable for access, then setting a first semaphore interrupt enable cell to a state indicating that the first processor needs to access the shared resource and the first processor waiting for a semaphore interrupt signal from the hardware semaphore circuit before again reading the state of the semaphore cell, any reading of the state of the semaphore cell by any processor setting the state of the semaphore cell to its second state, the semaphore cell changing back to its first state after the shared resource is again made available for access;
  continually monitoring the state of the semaphore cell by a semaphore interrupt cell of the hardware semaphore, the semaphore interrupt cell having third and fourth states with the fourth state indicating that the shared resource has just been made available for access, the semaphore interrupt cell changing to the fourth state whenever the semaphore cell being monitored has just changed from the second state back to the first state;
  reading the state of the semaphore cell by a second processor and if the state read from the semaphore cell is a first state then accessing the shared resource by the second processor, but if the state read from the semaphore cell is second state then setting a second semaphore interrupt enable cell to a state indicating that the second processor reads to access the share resource and the second processor waiting for a semaphore interrupt signal from the hardware semaphore circuit before again reading the state of the semaphore cell; and
  whenever the semaphore interrupt cell changes to the fourth state and either the first or second semaphore interrupt enable cell is in a state indicating that the respective first or second processor needs to access the shared resource, generating a semaphore interrupt signal for the respective first and second processor and transmitting said interrupt signal thereto over said system bus.

* * * * *